(12) United States Patent
Cha et al.

(10) Patent No.: US 10,989,550 B2
(45) Date of Patent: Apr. 27, 2021

(54) HYBRID ELECTRIC VEHICLE MANAGING DRIVING ROUTE AND DRIVING CONTROL METHOD FOR THE SAME

(71) Applicants: HYUNDAI MOTOR COMPANY, Seoul (KR); KIA MOTORS CORPORATION, Seoul (KR)

(72) Inventors: Jung Min Cha, Hwaseong-si (KR); Joon Young Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 133 days.

(21) Appl. No.: 16/202,542

(22) Filed: Nov. 28, 2018

(65) Prior Publication Data

US 2019/0390970 A1 Dec. 26, 2019

(30) Foreign Application Priority Data

Jun. 25, 2018 (KR) ........................ 10-2018-0072631

(51) Int. Cl.
*G01C 21/34* (2006.01)
*B60W 20/00* (2016.01)
*B60K 6/20* (2007.10)

(52) U.S. Cl.
CPC ......... *G01C 21/3469* (2013.01); *B60W 20/00* (2013.01); *G01C 21/3415* (2013.01); *B60K 6/20* (2013.01); *B60W 2510/244* (2013.01); *B60W 2556/50* (2020.02)

(58) Field of Classification Search
CPC ........................... G01C 21/3469; B60W 20/00
See application file for complete search history.

(56) References Cited

U.S. PATENT DOCUMENTS

| 9,469,289 | B2 * | 10/2016 | Yu ........................ B60W 20/12 |
| 2007/0294026 | A1 * | 12/2007 | Schirmer .............. B60W 10/08 |
| | | | 701/533 |
| 2013/0345976 | A1 | 12/2013 | Li et al. |
| 2014/0046595 | A1 * | 2/2014 | Segawa .................. G01C 21/34 |
| | | | 701/541 |

(Continued)

FOREIGN PATENT DOCUMENTS

| JP | 2011-162084 A | 8/2011 |
| JP | 2015-163026 A | 9/2015 |

(Continued)

*Primary Examiner* — Jess Whittington
(74) *Attorney, Agent, or Firm* — Brinks Gilson & Lione

(57) ABSTRACT

A driving control method of a hybrid electric vehicle (HEV) includes: determining whether an exhaust gas restricted area is present one a driving route; determining whether the HEV is possible to drive through the entire exhaust gas restricted area under a first-mode of driving in which only an electric motor of the HEV drives the HEV when the exhaust gas restricted area is present; calculating a charging route when the HEV is not possible to travel through the entire gas restricted area under the first-mode of driving; determining a possibility of traveling through the entire gas restricted area under the first-mode of driving before entering the calculated charging route; and calculating a bypass route based on determination that traveling the entire exhaust gas restricted area under the first-mode of driving is not possible.

14 Claims, 7 Drawing Sheets

(56) References Cited

U.S. PATENT DOCUMENTS

| | | | | |
|---|---|---|---|---|
| 2015/0291145 A1* | 10/2015 | Yu | ............... | B60W 20/12 |
| | | | | 701/22 |
| 2016/0209226 A1* | 7/2016 | Nagy | ............... | B62M 6/45 |
| 2017/0028978 A1* | 2/2017 | Dunlap | ............... | B60W 20/13 |
| 2017/0174204 A1* | 6/2017 | Jones | ............... | G07C 5/004 |
| 2019/0113354 A1* | 4/2019 | Matsumura | ............... | G05D 1/0217 |

FOREIGN PATENT DOCUMENTS

| | | |
|---|---|---|
| JP | 2016-049922 A | 4/2016 |
| JP | 2017-030517 A | 2/2017 |
| KR | 10-2017-0059676 A | 5/2017 |

\* cited by examiner

FIG. 1 "PRIOR ART"
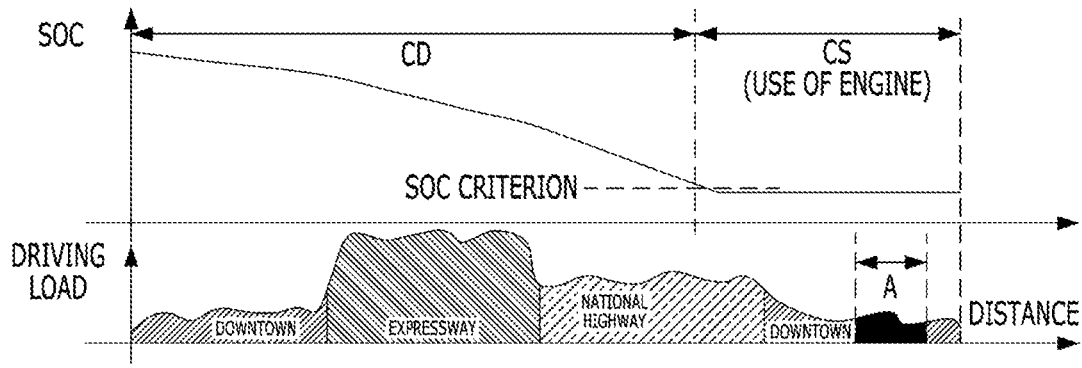
FIG. 2
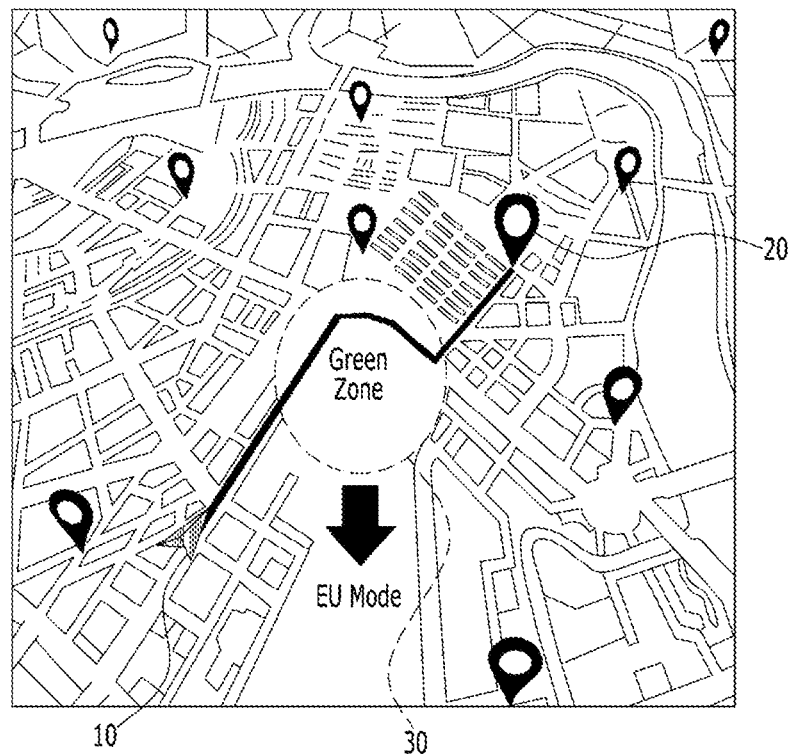

HYBRID ELECTRIC VEHICLE MANAGING DRIVING ROUTE AND DRIVING CONTROL METHOD FOR THE SAME

CROSS-REFERENCE TO RELATED APPLICATION

This application claims priority to and the benefit of Korean Patent Application No. 10-2018-0072631, filed on Jun. 25, 2018, the entire contents of which are incorporated herein by reference.

FIELD

The present disclosure relates to a hybrid electric vehicle and a driving mode control method for the same.

BACKGROUND

The statements in this section merely provide background information related to the present disclosure and may not constitute prior art.

In general, a hybrid electric vehicle (HEV) is a vehicle that uses two types of drive sources in a combined manner, and the two drive sources are mainly an internal combustion engine and an electric motor. Such a hybrid electric vehicle has excellent fuel efficiency and power performance, compared to a vehicle that is driven using only an internal combustion engine, and is also advantageous in that it reduces exhaust gases, and therefore, has actively been developed in recent years.

The hybrid electric vehicle may operate in two driving modes depending on which powertrain is driven. One of the driving modes is an electric vehicle (EV) mode in which the vehicle moves using only an electric motor, and the other one is a hybrid electric vehicle (HEV) mode in which both an electric motor and an engine are driven to obtain power. The hybrid electric vehicle performs switching between the two modes according to driving conditions.

In addition to the classification of the driving modes based on the powertrain described above, in the case of a plug-in hybrid electric vehicle (PHEV), driving modes thereof may be particularly classified into a charge-depleting (CD) mode and a charge-sustaining (CS) mode according to a change in the State-of-Charge (SoC) of a battery. In general, the vehicle moves by driving the electric motor with power of the battery in the CD mode, but mainly uses power of the engine so as to prevent deterioration in the SoC of the battery in the CS mode.

Switching between driving modes is generally performed in order to improve or maximize fuel efficiency or driving efficiency according to the efficiency characteristics of a powertrain. That is, control methods for switching between driving modes as described above focus on efficiency in the management of an eco-friendly vehicle, and are far from the final goal of an eco-friendly vehicle to be achieved in the future.

For example, as illustrated in FIG. 1, when switching between a CD mode and a CS mode is performed based on a driving load and the SoC of a battery, the vehicle may actually move in the CS mode in an area A in which a reduction in the discharge of exhaust gases is recommended or compelled for reasons, such as regulations, environmental protection, safety, and the density of pedestrians, although a driving load is low.

Although a method of forcibly causing the vehicle to move in an EV mode in response to a driver's choice in a specific section through the provision of a manual mode-switching button is conceivable, we have discovered that this method is inconvenient and has difficulty in securing the SoC required for the vehicle to move in the EV mode as much as possible in an area in which a reduction in the discharge of exhaust gases is desired.

Therefore, the present disclosure addresses a method of securing the SoC of a battery in advance in order to inhibit or prevent engine startup in an area in which a reduction in the discharge of exhaust gases is desired, or selecting a route which may bypass the corresponding area when it is difficult to secure the SoC.

SUMMARY

The present disclosure is directed to a hybrid electric vehicle (HEV) and a driving control method for the same that substantially obviate one or more problems due to limitations and disadvantages of the related art.

The present disclosure provides a method capable of performing engine startup in consideration of the surrounding situation and a hybrid electric vehicle which performs the method.

In particular, The present disclosure provides a method of securing a sufficient State-of-Charge (SoC) of a battery before entering an area that is not suitable for engine startup, or selecting a route which may bypass the corresponding area and a vehicle which performs the method.

The technical objects to be accomplished by the present disclosure are not limited to the aforementioned technical objects, and other unmentioned technical objects will be clearly understood from the following description by those having ordinary skill in the art.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a driving control method of a hybrid electric vehicle may include: determining whether or not an exhaust gas restricted area is present on a driving route of the HEV, a first determination of determining whether it is possible for the HEV to travel through the entire exhaust gas restricted area under a first-mode of driving in which only an electric motor of the HEV drives the HEV while the HEV is traveling on the driving route through the entire exhaust gas restricted area, calculating a charging route when it is not possible for the HEV to travel through the entire exhaust gas restricted area under the first-mode of driving, a second determination of determining whether it is possible for the HEV to travel through the entire exhaust gas restricted area under the first-mode of driving before the HEV enters the calculated charging route, and calculating a bypass route based on determination that traveling the entire exhaust gas restricted area under the first-mode of driving is not possible even after traveling the charging route.

In accordance with another aspect of the present disclosure, a hybrid electric vehicle includes: a first controller configured to determine whether an exhaust gas restricted area is present on a driving route of the HEV, and a second controller configured to: make a first determination of whether it is possible for the HEV to travel through the entire exhaust gas restricted area under a first-mode of driving in which only an electric motor of the HEV drives the HEV when the exhaust gas restricted area is present on the driving route, calculate a charging route when the HEV is not possible to travel through the entire exhaust gas restricted area under the first-mode of driving, make a second determination of whether it is possible for the HEV to travel through the entire exhaust gas restricted area under the first-mode of driving before the HEV enters the calculated charging route, and calculate a bypass route based on determination that traveling the entire exhaust gas restricted area under the first-mode of driving is not possible.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view for explaining a problem when mode-switching control is applied based on a general criterion;

FIG. 2 is a view for explaining the concept of a specific area;

Figure 3:
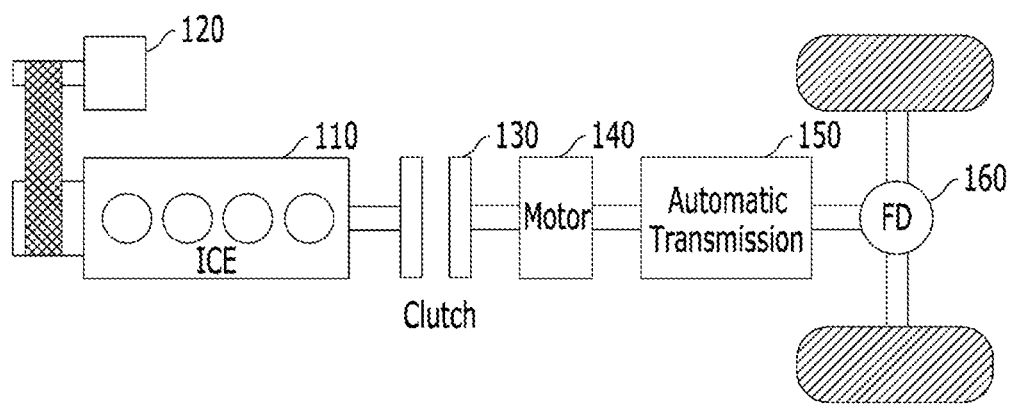
FIG. 3 illustrates an exemplary powertrain structure of a hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, reference will now be made in detail to the forms of the present disclosure, examples of which are illustrated in the accompanying drawings, to allow those skilled in the art to easily understand and reproduce the forms of the present disclosure. The present disclosure, however, are not limited to the forms disclosed hereinafter and may be embodied in many different forms. In the following description of the forms of the present disclosure, a detailed description of known functions or configurations incorporated herein will be omitted when it may make the subject matter of the disclosure rather unclear. In the entire specification, similar elements are denoted by similar reference numerals.

In the entire specification, when an element is referred to as "including" another element, the element should not be understood as excluding other elements so long as there is no special conflicting description, and the element may include at least one other element. In addition, throughout the specification, parts denoted by the same reference numerals refer to the same elements.

The present disclosure provides a method of securing a sufficient SoC of a battery in order to enable EV-mode driving in an area (e.g., an exhaust gas restricted area) that is affected by the discharge of exhaust gases when the corresponding area is present along a driving route, or setting a bypass route of the corresponding area and controlling driving and a hybrid electric vehicle for performing the method.

Prior to describing the method of setting a route and controlling driving according to the forms of the present disclosure, the concept of an area that is affected by the discharge of exhaust gases and the structure and the control system of a hybrid electric vehicle, to which the forms are applicable, will be described.

First, the concept of an area in which engine startup needs to be suppressed will be described with reference to FIG. 2. FIG. 2 is a view for explaining the concept of a specific area, to which the forms of the present disclosure are applicable.

Referring to FIG. 2, in one form of the present disclosure, a specific area 30 (e.g., a green zone; an exhaust gas restricted area) in which it is desired to reduce or prevent the discharge of exhaust gases may be present between a point of departure 10 and a destination 20 (namely, a driving route). This specific area 30 (e.g., exhaust gas restricted area) may be a preset area, or may be variably set according to a current/recent situation. Here, for example, the preset area may be an area that is set by regulations, government policies, or the like (e.g. an exhaust gas management area in Seoul, London, or the like), or may be an area in which reduced discharge of exhaust gases is desired due to regional characteristics (e.g. a child protection zone, an indoor parking lot, or a residential zone). The variably set area may be, for example, an area in which whether or not the current setting is possible may be confirmed via wireless information such as telematics, or a pedestrian-congested area that is determined via an in-vehicle visual information acquisition device (e.g. an ADAS). For example, when a pedestrian-congested area is determined based on big-data-based location information of a smart phone, or when it is estimated based on the average speed of vehicles and the volume of traffic obtained via telematics service, or the like that a large amount of exhaust gases is generated in a certain area, the corresponding area may be set to the specific area 30.

The specific area 30 may be set based on an arbitrary administrative division, may be set to a zone defined by connecting a plurality of coordinates at boundary points, or may be set to the coordinates of a specific facility or a zone within a predetermined radial distance from the specific facility.

It is to be noted that the examples of setting the specific area described above are given merely by way of example and the present disclosure is not limited, for example, by the setting criteria, setting range, or setting period of these specific areas. In addition, although the specific area 30 is assumed to be located between the point of departure 10 and the destination 20, it may not be necessary for the destination 20 to be explicitly set by a user using the navigation function of an audio/video/navigation (AVN) system. For example, the destination 20 may be arbitrarily set by a vehicle according to a driver's driving pattern or a preset driving condition (e.g., time and area). However, whether or not the specific area 30 is present along a route and the size of the specific area 30 may at least be acquired by a vehicle before the vehicle enters the corresponding area for distribution of modes.

A more detailed method of determining the specific area 30 will be described below with reference to FIG. 5. In the following description, for convenience, a specific area in which it is desired to reduce or prevent the discharge of exhaust gases will be referred to as a "green zone".

Next, the structure of a hybrid electric vehicle, to which the forms of the present disclosure are applicable, will be described with reference to FIG. 3. FIG. 3 illustrates an exemplary powertrain structure of a hybrid electric vehicle, to which the forms of the present disclosure are applicable.

Referring to FIG. 3, there is illustrated the powertrain of the hybrid electric vehicle, which employs a parallel-type hybrid system in which an electric motor (or a driving motor) 140 and an engine clutch (EC) 130 are mounted between an internal combustion engine (ICE) 110 and a transmission 150.

In such a vehicle, when a driver steps on an accelerator pedal after starting, the motor 140 is first driven using power of a battery in the state in which the engine clutch 130 is opened, and power of the motor is transmitted through the transmission 150 and a final drive (FD) 160 to thereby move wheels (i.e. an EV mode). When the vehicle is gradually accelerated and desires greater drive power, an auxiliary motor (or a starter-generator motor) 120 may be operated to drive the engine 110.

Thereby, when the rotational speeds of the engine 110 and the motor 140 become the same, the engine clutch 130 is engaged so that both the engine 110 and the motor 140 drive the vehicle or so that the engine 110 drives the vehicle (i.e., transition from the EV mode to an HEV mode). When a preset engine-off condition, such as deceleration of the vehicle, is satisfied, the engine clutch 130 is opened and the engine 110 is stopped (i.e. transition from the HEV mode to the EV mode). In addition, the hybrid electric vehicle may charge the battery by converting the drive force of wheels into electricity at the time of braking, and this is referred to as braking energy regeneration or regenerative braking.

The starter-generator motor 120 serves as a starter motor when the engine is started, and also serves as a generator motor at the time of recovery of rotational energy of the engine after starting or turning off the engine. Therefore, the starter-generator motor 120 may be referred to as a "hybrid starter generator (HSG)", and may also be referred to as an "auxiliary motor" in some cases.

Figure 4:
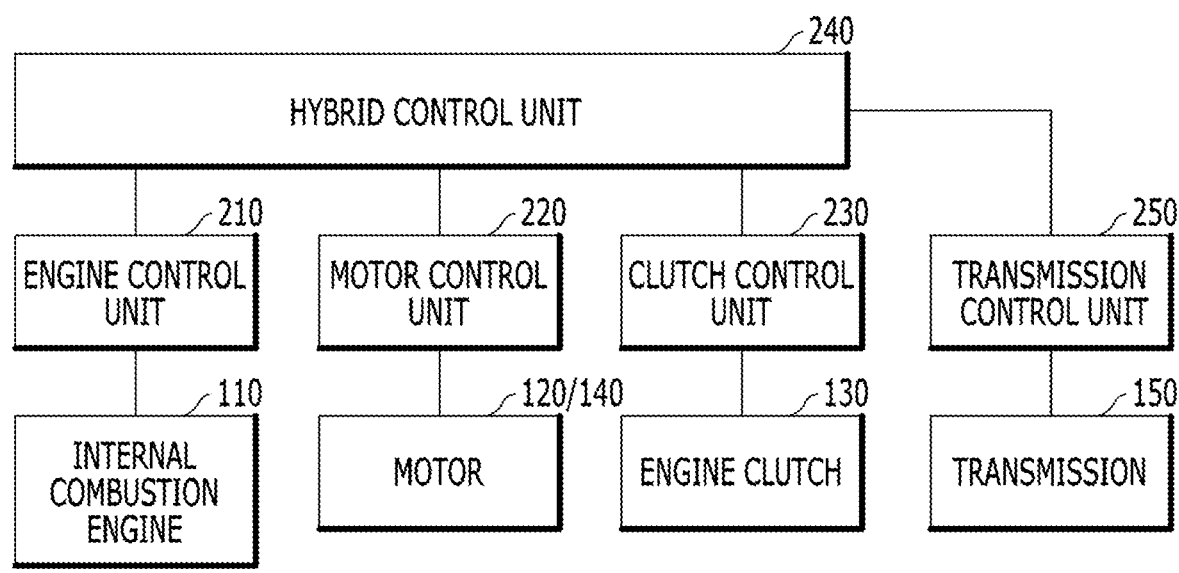
FIG. 4 is a block diagram of an exemplary control system of a hybrid electric vehicle.

The mutual relationship between control units in the vehicle to which the above-described powertrain is applied is illustrated in FIG. 4.

FIG. 4 is a block diagram illustrating an exemplary control system of a hybrid electric vehicle to which the forms of the present disclosure are applicable.

Referring to FIG. 4, in the hybrid electric vehicle, the internal combustion engine 110 may be controlled by an engine control unit 210, the torques of the starter-generator motor 120 and the electric motor 140 may be controlled by a motor control unit (MCU) 220, and the engine clutch 130 may be controlled by a clutch control unit 230. Here, the engine control unit 210 may be an engine management system (EMS). In addition, the transmission 150 is controlled by a transmission control unit 250. In some cases, a control unit for the starter-generator motor 120 and a control unit for the electric motor 140 may be separately provided.

The respective control units may be connected to a hybrid control unit (HCU) 240, which is a superordinate control unit for controlling an overall mode switching process, and may provide information desired for driving mode switching, information desired for engine clutch control upon gear shifting, and/or information desired for engine stop control under the control of the hybrid control unit 240 to the hybrid control unit 240, or may perform an operation in response to a control signal.

More specifically, the hybrid control unit 240 determines whether or not to perform mode switching according to the driving state of the vehicle. In one example, the hybrid control unit 240 determines the point in time at which the engine clutch 130 is opened, and performs hydraulic control (in the case of a wet EC) or torque capacity control (in the case of a dry EC) when the engine clutch 130 is opened. In addition, the hybrid control unit 240 may determine the state of the engine clutch 130 (e.g., the lock-up state, the slip state, or the opened state), and may control the point in time at which the engine 110 stops fuel injection. In addition, the hybrid control unit 240 may transfer a torque command for controlling the torque of the starter-generator motor 120 in order to stop the engine to the motor control unit 220 so as to control the recovery of rotational energy of the engine. In addition, the hybrid control unit 240 may control a subordinate control unit for the determination of a mode-switching condition and the implementation of mode switching at the time of controlling driving mode switching.

It will become apparent to those skilled in the art that the connection relationships between the control units and the functions and identification of the respective control units described above are merely given by way of example, and moreover that the respective control units are not limited by the names thereof. For example, the hybrid control unit 240 may be realized such that the function thereof is replaced with and provided by any one of the other control units excluding the hybrid control unit 240 and such that the function thereof is distributed to and provided by two or more of the other control units.

Hereinafter, the configuration of a hybrid electric vehicle according to one form, by which a green zone is determined and priorities for selecting a bypass route, which will be described below, are determined, will be described with reference to FIG. 5.

Figure 5:
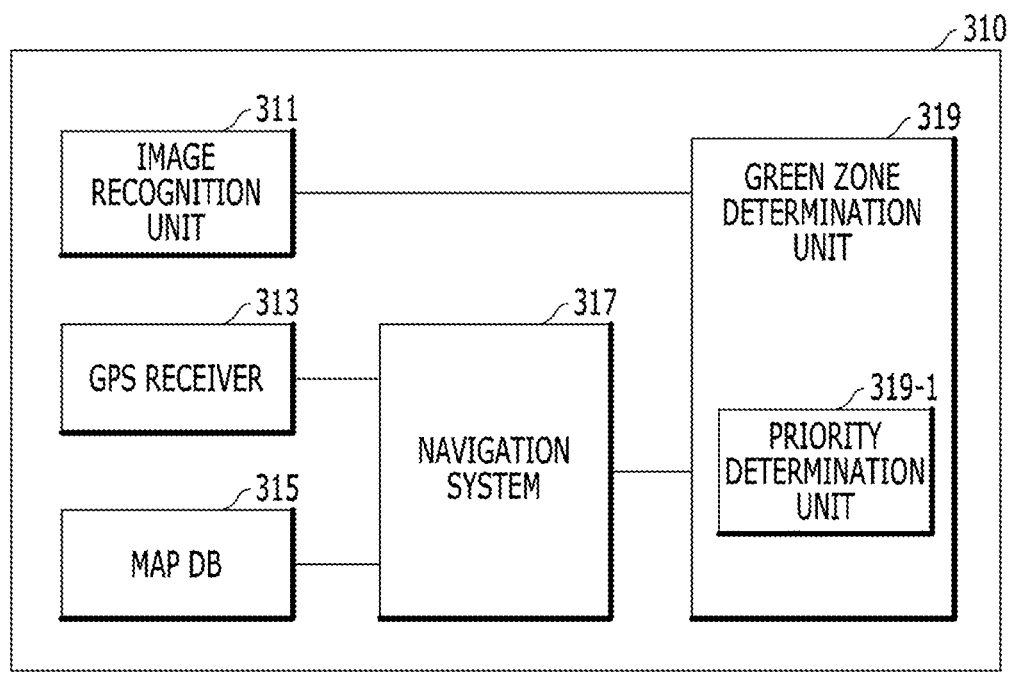
FIG. 5 is a block diagram illustrating an exemplary structure of a hybrid electric vehicle for performing determination of a green zone and determination of priorities for respective routes.

FIG. 5 is a block diagram illustrating an exemplary structure of a hybrid electric vehicle for performing determination of a green zone and determination of priorities for respective routes.

Referring to FIG. 5, a hybrid electric vehicle 310 may include an image recognition unit 311 which performs recognition of an image, a GPS receiver 313 which acquires current location information, a map database 315 which stores map information therein, a navigation system 317, and a green zone determination unit 319. The green zone determination unit 319 may include a priority determination unit 319-1.

The image recognition unit 311 may include at least one image acquisition device such as, for example, a camera, and may acquire an image of the surroundings of the vehicle. The acquired image may be subjected to various processes such as extraction of feature points, recognition of signs, and recognition of objects, in order to enable determination of whether the current location is an indoor or outdoor location or whether the current location corresponds to a green zone such as a parking lot, a park, a drive through, or a hospital and determination of a population density, for example.

The GPS receiver 313 may include at least one GPS module to acquire current location information of the vehicle, and may transfer the current location information to the navigation system 317.

The map database 315 may store map information, and may also store information, such as the type of a road, the gradient of a road, and the distance to a destination, and green zone setting information.

The navigation system 317 may apply the location information transferred from the GPS receiver 313 to the map information in the map database 315 and may determine whether or not the current location corresponds to a green zone set in the map information, whether or not a green zone is present along a driving route when a destination is input, the position of a green zone, the length of a green zone, and the regional characteristics in a green zone, for example. In addition, the navigation system 317 may also serve to provide information desired to set a bypass route, which will be described below.

The green zone determination unit 319 may finally determine whether or not the current location corresponds to a green zone based on combined information from the image recognition unit 311 and the navigation system 317. The priority determination unit 319-1 may acquire the criterion of determination of priorities, which will be described below, and regional information about bypass route candidates to be compared with the criterion of determination (e.g. the distribution and composition of population based on big data and geographic features), and may determine priorities for respective bypass route candidates based on the acquired information. Here, the criterion of determination of priorities may be stored in advance, or may be received from an external source. In addition, information about the surroundings of the bypass route candidates may be received from an external source via the navigation system 317, a telematics unit, or a separate wireless communication module.

According to an aspect of the present disclosure, the image recognition unit 311 may use an image acquisition device provided in an advanced driver assistance system (ADAS), and may be realized so as to be included in the ADAS.

In addition, in one form, the navigation system 317 may be realized in the form of an audio/video/navigation (AVN) system.

In another form, the green zone determination unit 319 may be realized as a control unit separated from the AVN system, or may be realized so as to be included in the AVN system. When taking the form of a separate control unit, the green zone determination unit 319 may be a hybrid control unit, without being limited thereto. When the green zone determination unit 319 is a hybrid control unit, the hybrid control unit may determine, for example, the energy desired to drive through a green zone in an EV mode and the chargeable amount of a battery before entering the green zone based on the information acquired from the respective components described above, thereby determining whether or not to bypass the green zone and determining which bypass route to select when bypassing the green zone. Then, the green zone determination unit 319 may provide the result of the determination to the navigation system 317 so as to allow the navigation system 317 to set a new route. In addition, the hybrid control unit may perform HEV-mode driving so that a battery is charged until the vehicle enters a green zone, and may perform EV-mode driving once the vehicle has entered the green zone.

In one form, at the final stage of determination of a green zone, when the result of determination of the image recognition unit 311 and the result of determination of the navigation system 317 differ from each other, the green zone determination unit 319 may apply a weight to any one of the results of determination, or may finally determine that the current location is a green zone only when the two results of determination equally show that the current location is a green zone.

In addition, the image recognition unit 311 may transfer an acquired image or a processed image output, other than the result of whether or not the current location is a green zone, to the green zone determination unit 319, to allow the green zone determination unit 319 to determine whether or not the current location is a green zone using the transferred image. In addition, a driver may directly input a command indicating that the current area corresponds to a green zone by operating a predetermined button or menu, for example.

Hereinafter, a process of selecting a charging route before entering a green zone will be described based on the configuration of the vehicle described above.

Figure 6:
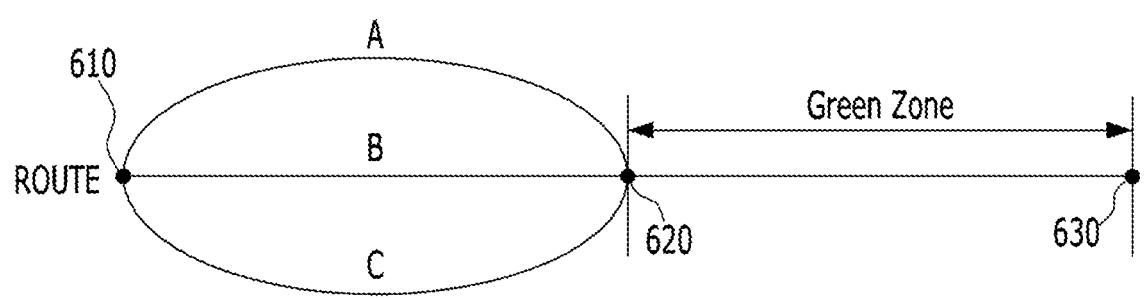
FIG. 6 illustrates exemplary routes before a green zone for explaining a process of selecting a charging route before entering the green zone.
Figure 7:
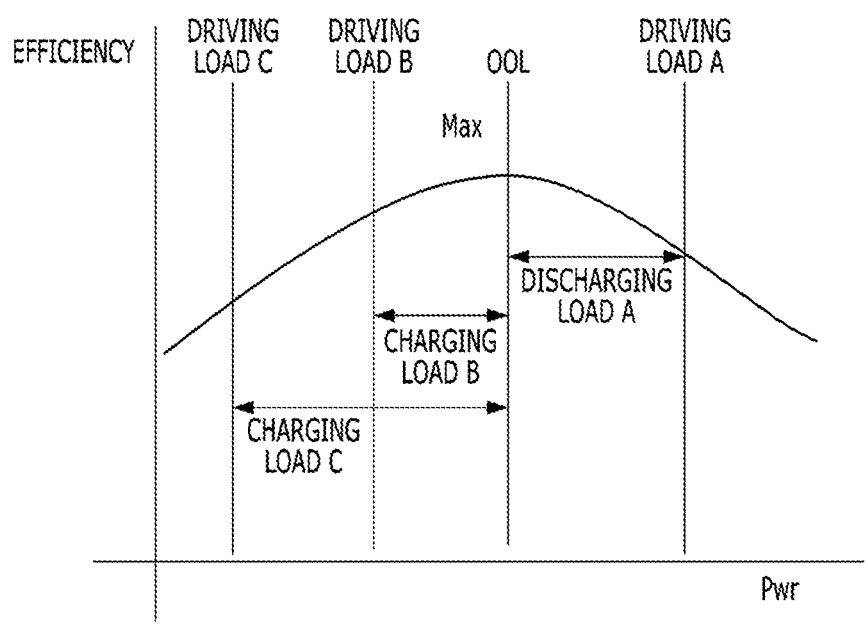
FIG. 7 illustrates the relationship between a driving load for each route illustrated in FIG. 6 and an optimal-efficiency operating point.

FIG. 6 illustrates exemplary routes before a green zone for explaining a process of selecting a charging route before entering the green zone according to one form of the present disclosure, and FIG. 7 illustrates the relationship between a driving load for each route illustrated in FIG. 6 and an optimal-efficiency operating point.

In FIG. 6, there are three different routes A, B and C between the current location and a green zone. Specifically, the route A is assumed to have a length of 1 km, an average vehicle speed of 60 kph, and an average gradient of 4 degrees, the route B is assumed to have a length of 2 km, an average vehicle speed of 50 kph, and an average gradient of 0 degrees, and the route C is assumed to have a length of 2 km, an average vehicle speed of 40 kph, and an average gradient of −1 degrees.

As described above, the hybrid control unit may determine the energy desired to drive through a green zone in an EV mode (hereinafter referred to as "green zone driving energy" for convenience) based on information provided from the navigation system, or the like. For example, the green zone driving energy (J) may be acquired by multiplying a green zone driving time (s) by a driving load (w) while driving through a green zone. Here, the green zone driving time may be acquired by dividing the distance from a green zone beginning point 620 to a green zone ending point 630 by an expected average speed in the green zone. The expected average speed in the green zone may be acquired via the navigation system 317. In addition, the driving load may be acquired by the sum of air resistance Ra, rolling resistance Rr, and gradient resistance Rc. The air resistance Ra may be acquired by "½*Cd*ρ*A*V^2", the gradient resistance Rc may be acquired by "W*sin θ", and the rolling resistance Rr may be acquired by "μW". In the equations for acquiring the respective resistances, the meaning of the respective symbols are as follows:

Cd: air resistance coefficient, ρ: air density, A: entire vehicle projection area, V: relative speed of the vehicle, W: total vehicle mass (hereinafter assumed to be 1 ton), g: gravitational acceleration, θ: gradient, and ρ: rolling resistance coefficient.

For example, assuming that the average vehicle speed in the green zone is 40 kph, the length is 1 km, and the average gradient is 0 degrees, the green zone driving load may be 30.86 w when a common factor is excluded from calculation for convenience. In addition, the green zone driving time may be 90 seconds. In conclusion, the green zone driving energy may be 90*30.86, i.e. 2777 J.

When the green zone driving energy is acquired, the hybrid control unit may determine based on the green zone driving energy whether or not the vehicle is capable of driving through the green zone in an EV mode with the current SoC of a battery. For example, the hybrid control unit may determine whether or not EV-mode driving is possible based on whether or not the energy corresponding to the SoC acquired by subtracting a preset minimum maintenance SoC (e.g. the SoC corresponding to the criterion of compulsory switching from an EV mode to an HEV mode) from the current SoC is equal to or greater than the green zone driving energy.

When the result of the determination is that the vehicle is capable of driving through the green zone (i.e. running the whole green zone) in an EV mode, the hybrid control unit may maintain the current route. On the other hand, when the result of the determination is that the vehicle is not capable of driving through the green zone in an EV mode, the hybrid control unit may calculate charging energy during driving for each selectable route up to the green zone. The charging energy may be acquired by multiplying a route charging load by a route driving time, and the route charging load may be acquired by subtracting a route driving load from the output at an optimal-efficiency operating point. This will be described below with reference to FIG. 7.

In FIG. 7, for efficiency of charging, the case in which charging is always performed at an optimal-efficiency-power output operating point at which a powertrain system exhibits maximum efficiency during HEV-mode driving, for example, the optimal operating line (OOL) is assumed. In this case, since the SoC is reduced (i.e. charging load B<charging load C) as the driving load approaches the output of the OOL, but route loss is also reduced, it may be desirable to drive along the route having a driving load B as long as charging energy is sufficient. Meanwhile, since a driving load A is greater than the output of the OOL, charging may not be performed. Thus, the route having the driving load A may be excluded from the determination of a charging route.

Referring back to FIG. 6, the route driving load is acquired in the same manner as the green zone driving load, and thus a repeated description thereof is omitted. It is to be noted that the driving time for each route is acquired based on the distance from a current location 610 to the green zone beginning point 620.

Hereinafter, the driving energy for the respective routes A, B and C is acquired based on the above-described assumption. For convenience, it is assumed that the vehicle weight is 1 ton and that the average engine output at the optimal-efficiency-power output operating point is 300 W.

As described in the above assumption, the route A is under an environment in which the average driving speed is 60 km/h, the length is 1 km, and the average gradient is 4°.

The route-A charging energy (J) may be acquired by "route-A driving time (s)×(OOL driving load (w)−route-A driving load (w))", and the route-A driving load may be 346.7 w, which is acquired by "air resistance Ra+gradient resistance Rc=(60000 m/3600 s)^2+(1000 kg×sin4°)". In conclusion, the route-A driving energy (J) is −2802 J, which is acquired by "60 s×(300 w−346.7 w)". That is, when driving along the route A, the vehicle is not capable of performing charging since an additional output of 2802 J is desired based on the optimal efficiency power.

Next, the route B is under an environment in which the average driving speed is 50 km/h, the length is 2 km, and the average gradient is 0°.

The route-B charging energy (J) may be acquired by "route-B driving time (s)×(OOL driving load (w)−route-B driving load (w))", and the route-B driving load may be 277 w, which is acquired by "air resistance Ra=(60000 m/3600 s)^2". In conclusion, the route-B driving energy (J) is 3312 J, which is acquired by "144 s=(300 w−277 w). That is, when driving along the route B, the SoC corresponding to 3312 J may be expected.

Next, the route C is under an environment in which the average driving speed is 40 km/h, the length is 2 km, and the average gradient is −1°. The route-C charging energy (J) may be acquired by "route-C driving time (s)×(OOL driving load (w)−route-C driving load (w))", and the route-C driving load may be 106 w, which is acquired by "air resistance Ra+gradient resistance Rc=(40000 m/3600 s)^2"+(1000 kg×sin−1°)". In conclusion, the route-C driving energy (J) is 388000 J, which is acquired by "180 s×(300 w−106 w). That is, when driving along the route C, the SoC corresponding to 38800 J may be expected.

In summary, since the green zone driving energy is 2777 J, an expected SoC satisfies the green zone driving energy when driving along the route B or the route C. Since the route B and the route C show the same driving distance, in consideration of route loss as described above, it may be desirable to select the route B which has a small difference between the optimal efficiency power and the driving load. It is to be noted that the charging route may be selected by applying different weights to the length of the route or the route driving time according to setting, instead of the difference between the optimal efficiency power and the driving load. In addition, the expected SoC for each route may be directly compared with the green zone driving energy, or may be added to the energy corresponding to the currently available SoC so that the sum thereof is compared with the green zone driving energy.

Next, a method of selecting a bypass route so as to bypass a green zone rather than entering the green zone when it is impossible in the above-described charging route selection process to select a route that is capable of sufficiently securing the green zone driving energy (for example, when the expected SoC of a selectable route is insufficient compared to the green zone driving energy) will be described. First, the case in which a bypass route is selected will be described with reference to FIGS. 8A and 8B.

Figure 8A:
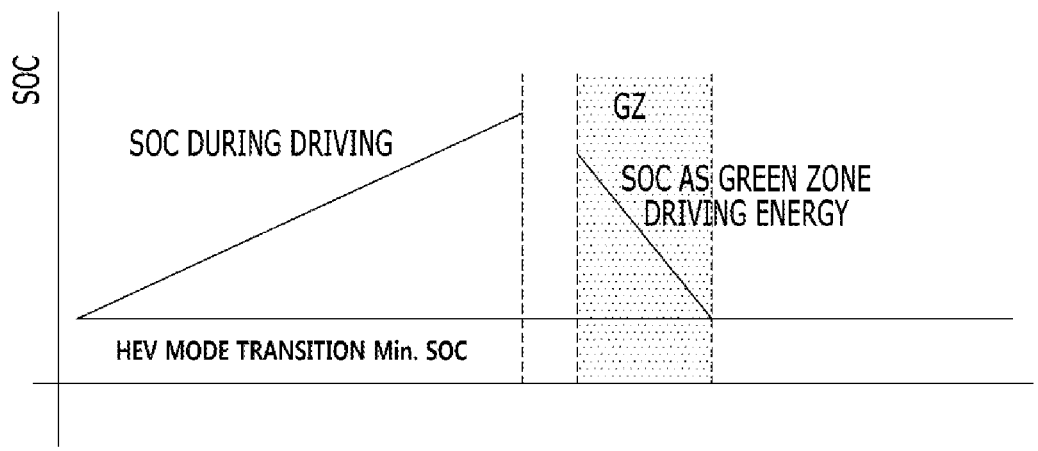
FIGS. 8A and 8B illustrate the exemplary relationship between the state-of-charge of a battery during driving and green zone driving energy.
Figure 8B:
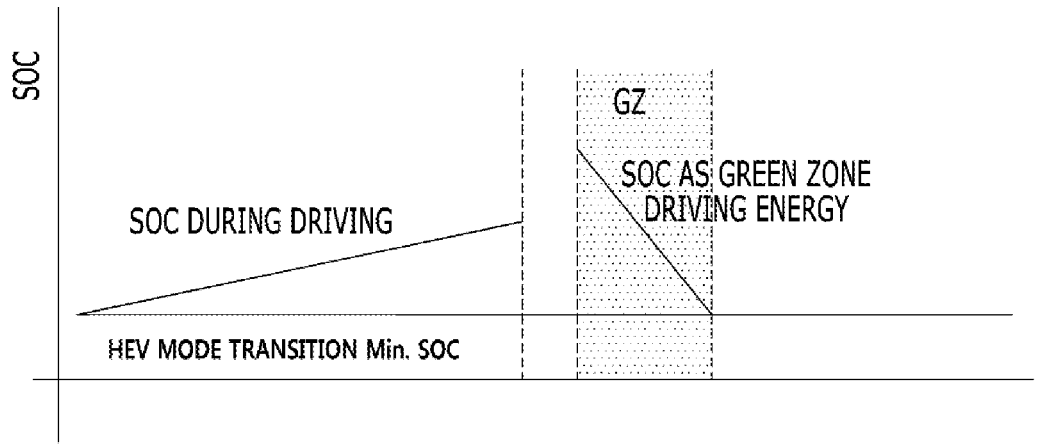

FIGS. 8A and 8B illustrate the exemplary relationship between the state-of-charge during driving and the green zone driving energy according to an exemplary form of the present disclosure. In the graphs illustrated respectively in FIGS. 8A and 8B, in common, the vertical axis represents the SoC of a battery and the horizontal axis represents the distance. In FIGS. 8A and 8B, for convenience, the SoC at the current location (beginning point) is assumed to correspond to the minimum SoC as the criterion of compulsory switching from an EV mode to an HEV mode (i.e. HEV switching min SoC), but a battery may have a greater SoC. It is to be noted that the greater the SoC at the beginning point than the HEV switching min SoC, the smaller SoC during driving may be desired for EV-mode driving through the entire green zone.

First, in FIG. 8A, there is illustrated the case in which an increased SoC, which corresponds to the SoC during driving in the selected charging route from the current location (beginning point) to the green zone as described above, is greater than the SoC corresponding to the green zone driving energy. In this case, since the vehicle is capable of driving through the entire green zone in an EV mode, it may be unnecessary to bypass the green zone.

Unlike this, in FIG. 8B, there is illustrated the case in which an increased SoC, which corresponds to the SoC during driving in the selected charging route from the current location (beginning point) to the green zone as described above, is less than the SoC corresponding to the green zone driving energy. In this case, since the vehicle is not capable of driving through the entire green zone in an EV mode, and thus it is expected that compulsory switching from an EV mode to an HEV mode occurs while the vehicle is driving through the green zone. Thus, this case may correspond to a situation in which it is desired to set a green zone bypass route.

In this way, when it is difficult to secure green zone driving energy before entering a green zone, the hybrid control unit may search for at least one route that bypasses the green zone and determine priorities for respective routes, thereby setting a bypass route based on the result of the determination.

First, the concept of priorities in one form of the present disclosure will be described.

The priorities may be determined according to objects which are present along a driving route and need to be protected by different degrees. For example, when setting three priorities, the criteria of the respective priorities may be as follows:

1 priority: areas in which there are many people who have a high heart rate and thus breath fast based on data analyzed via IoT devices such as heart rate measurement devices or auxiliary fitness devices;

2 priority: areas in which there are many people who need to be protected first such as the elderly and the infirm and unhealthy people based on geographic features (e.g., hospitals, schools, child care facilities, and sanatoriums); and

3 priority: congested areas with floating population based on handheld devices, floating population monitoring sensors, and the like.

It is to be noted that the number of priorities and the sorting criteria described above are given by way of example and a greater or lesser number of priorities may be given and that the criteria may be variably set in consideration of big-data-based real-time data accumulation or cumulative statistics, split-timed variation, and the like.

A vehicle may acquire at least one of the priority sorting criteria, information desired to determine priorities for respective areas, or information about the respective areas corresponding to the priorities in a wireless manner from an external device such as a telematics center or a service server. When acquiring such information, the vehicle may determine lengths of respective bypass routes, and may select a bypass route based on the acquired information and the result of the determination. For example, when the difference between the lengths of the respective bypass routes is within a predetermined range, a bypass route having a low priority may be set. When the difference between the lengths of the respective bypass routes exceeds the predetermined range, the bypass route having the shortest distance may be set regardless of the priorities. This will be described below with reference to FIG. 9.

Figure 9:
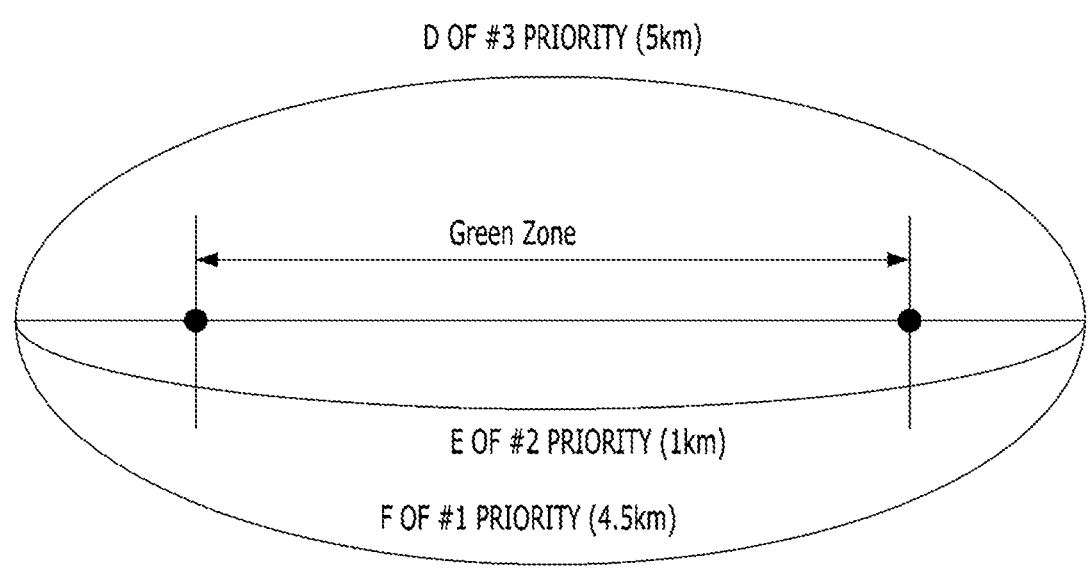
FIG. 9 illustrates exemplary bypass routes.

FIG. 9 illustrates exemplary bypass routes in one form of the present disclosure.

Referring to FIG. 9, there is illustrated the case in which three green zone bypass routes including a route D, a route E, and a route F are present, in addition to an existing route that passes through a green zone.

Here, it is assumed that the route D has a length of 5 km and corresponds to the #3 priority among the above-described priorities, the route E has a length of 1 km and corresponds to the #2 priority among the above-described priorities, and the route F has a length of 4.5 km and corresponds to the #1 priority among the above-described priorities.

Based on the above assumption, when the route D and the route F are searched for, since the two routes have similar lengths, the route D, which is relatively longer than the route F but corresponds to the #3 priority, may be selected.

In another example, when all of the route D, the route E, and the route F are searched for, since the route E is shorter than ¼ of the other routes, the route E may be selected regardless of the priorities. It is to be noted that the criterion of the difference between the lengths that causes the priorities to be ignored may be that one length is several times of the other length, or may be set to a concrete value, for example, "the difference of 3 km or more".

The above-described process of selecting the charging route before entering the green zone and selecting the bypass route described above is summarized in FIG. 10.

Figure 10:
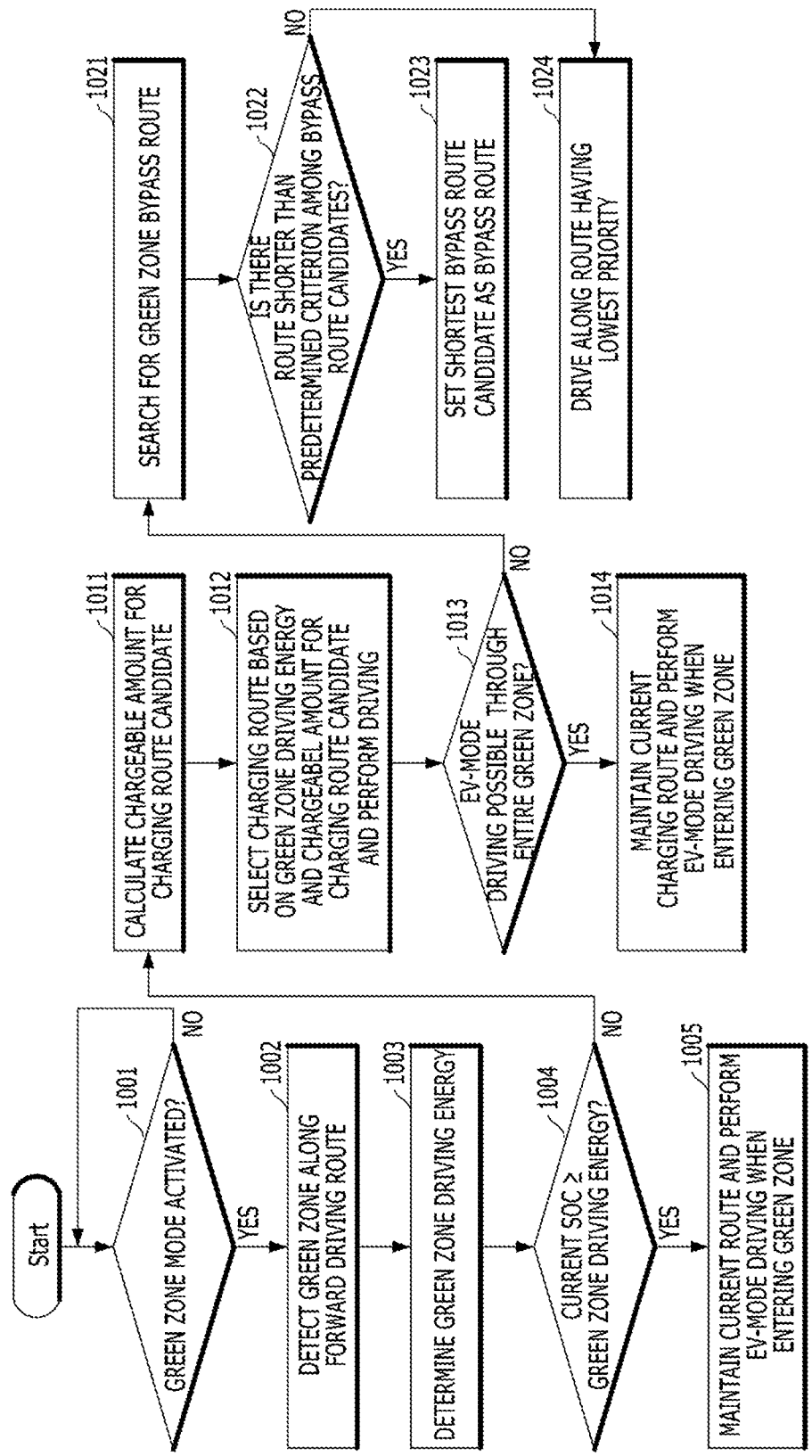
FIG. 10 is a flowchart illustrating an exemplary process of selecting a route and controlling driving.

FIG. 10 is a flowchart illustrating an exemplary process of selecting a route and controlling driving in another form of the present disclosure.

Referring to FIG. 10, first, whether or not to a green zone mode is activated may be determined (S1001). Here, the green zone mode may refer to a mode that is capable of setting a charging route in order to drive through the entire green zone in an EV mode or setting a bypass route to avoid the green zone as described above. In some forms, this step may be omitted.

In the state in which the green zone mode is activated, whether or not a green zone is present along a forward driving route may be detected (S1002).

When the green zone is detected along the route, the green zone driving energy desired to drive through the entire green zone in an EV mode may be determined (S1003).

Here, a method of determining the presence/absence of the green zone and a method of determining the green zone driving energy have been described above, and thus a description thereof is omitted below.

When the result of the determination is that the currently available SoC (e.g. the energy acquired by subtracting the minimum SoC as the criterion of mode switching from an EV mode to an HEV mode from the current SoC) is equal to or greater than the green zone driving energy, the current route may be maintained, and the EV mode may be maintained from the time when the vehicle enters the green zone until the vehicle passes through the green zone.

When the currently available SoC is less than the green zone driving energy, one or more charging route candidates may be searched for, and a chargeable amount for each charging route candidate may be calculated (S1011).

One of the charging route candidates may be selected based on the calculated chargeable amount for each charging route candidate and the calculated green zone driving energy, and a battery may be charged during HEV-mode driving while driving along a selected charging route (S1012). Here, the chargeable amount for each route and the method of selecting the charging route candidate have been described above with reference to FIGS. 6 and 7, and thus a repeated description thereof is omitted.

After the charging route is selected, whether or not the vehicle is capable of driving through the green zone in an EV mode may be determined based on whether or not the currently available energy of the battery is equal to or greater than the green zone driving energy before the vehicle enters the green zone (S1013).

When it is determined before the vehicle enters the green zone that the vehicle is capable of driving through the green zone in an EV mode, the current charging route is maintained, and the EV mode may be maintained from the time when the vehicle enters the green zone until the vehicle passes through the green zone (S1014).

When a sufficient SoC is not achieved despite driving along the selected charging route, a bypass route for the green zone may be searched for (S1021). Here, that the bypass route is searched for may mean that the lengths of the respective bypass route candidates and the preset priorities of the bypass route candidates based on the degrees of protection of objects along the route are determined.

When the searched result is that there is a route shorter than a predetermined criterion among the bypass route candidates (S1022), the shortest bypass route candidate may be set to a bypass route (S1023). When there is no route shorter than the predetermined criterion among the searched bypass route candidates, the route having the lowest priority may be set to a bypass route (S1024).

With the method of selecting the route and controlling driving described above, the following effects may be expected.

Since energy desired for EV-mode driving through the entire green zone may be calculated in advance before the vehicle enters the green zone, an optimal charging route may be selected in consideration of charging efficiency before the vehicle enters the green zone. Thus, it is possible to prevent energy waste due to overcharging and to reduce the discharge of exhaust gases in the green zone.

In addition, it is possible to prevent the discharge of exhaust gases in the green zone by causing the vehicle to bypass the green zone when an expected SoC in the charging route does not satisfy the green zone driving energy, and to reduce or minimize damage to objects of protection around the bypass route by considering priorities when selecting a bypass route. In addition, it is possible to prevent unnecessary discharge of exhaust gases by further considering the length of the bypass route in addition to the priority thereof.

The present disclosure described above may be implemented as computer readable code in a recording medium in which a program is stored. A computer readable medium includes all types of recording devices in which data that is readable by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device.

As is apparent from the above description, a hybrid electric vehicle according to at least one form of the present disclosure having the above-described configuration may perform engine startup in consideration of the surrounding situation.

In particular, when a driving route includes a specific area, since the SoC of a battery is secured before the vehicle reaches the corresponding area or since a bypass route is set according to priorities when it is difficult to secure the SoC, it is possible to preserve the environment and protect pedestrians.

The effects to be accomplished by the present disclosure are not limited to the aforementioned effects, and other unmentioned effects will be clearly understood from the above description by those having ordinary skill in the art.

The above detailed description should not be construed as being limited in all terms, but should be considered to be exemplary. The scope of the present disclosure should be determined by the reasonable interpretation of the accompanying claims, and all changes that fall within the range equivalent to the present disclosure should be understood as belonging to the scope of the present disclosure.

What is claimed is:

1. A driving control method of a hybrid electric vehicle (HEV), the method comprising:
   receiving, by a global positioning system (GPS) receiver of the HEV, a current location information of the HEV, and transferring the received current location information to a navigation system;
   determining, by the navigation system and a first controller of the HEV, whether an exhaust gas restricted area is present on a driving route of the HEV based on the received current location information, destination information and GPS information of the HEV;
   a first determination of determining, by a second controller of the HEV, whether it is possible for the HEV to travel through the entire exhaust gas restricted area under a first-mode of driving in which only an electric motor of the HEV drives the HEV while the HEV is traveling on the driving route through the exhaust gas restricted area;
   calculating, by the second controller of the HEV, a charging route where charging of a battery of the HEV is performed in a second-mode of driving in which an engine of the HEV drives the HEV when it is not possible for the HEV to travel through the entire exhaust gas restricted area under the first-mode of driving;
   a second determination of determining, by the second controller of the HEV, whether it is possible for the HEV to travel through the entire exhaust gas restricted area under the first-mode of driving while the HEV travels on the calculated charging route;
   controlling, by the second controller of the HEV, the HEV to travel on the calculated charging route in the second-mode of driving, and switching to the first-mode of driving when the HEV enters the exhaust gas restricted area;
   performing, by the second controller of the HEV, the first-mode of driving from a time of entering the exhaust gas restricted area until a time of exiting the exhaust gas restricted area after traveling the calculated charging route when the driving through the entire exhaust gas restricted area under the first-mode of driving is possible; and
   calculating, by the second controller of the HEV, a bypass route based on determination that traveling the entire exhaust gas restricted area under the first-mode of driving is not possible even after traveling the charging route,
   wherein at least one of the first determination or the second determination comprises:

calculating a first energy required for the first-mode of driving to travel through the entire exhaust gas restricted area; and comparing the calculated first energy with a second energy corresponding to a currently available state-of-charge (SoC) of a battery of the HEV, and wherein calculating the charging route comprises:

determining at least one charging route candidate between the received current location and a beginning point of the exhaust gas restricted area on the driving route of the HEV;

calculating a third energy corresponding to an expected charging amount of the battery for the at least one charging route candidate; and selecting the charging route from among the at least one charging route candidate based on the first energy, the second energy, the third energy, and optimal-efficiency power of a powertrain of the HEV.

2. The method according to claim 1, wherein calculating the first energy is performed based on an average driving load and an expected driving time of the exhaust gas restricted area.

3. The method according to claim 1, wherein the currently available SoC of the battery is a value acquired by subtracting a preset maintenance SoC of the battery from a current SoC of the battery.

4. The method according to claim 1, wherein calculating the bypass route comprises:

determining at least one bypass route candidate between the received current location and the destination of the driving route to avoid the exhaust gas restricted area on the driving route;

determining a length and a priority based on an object of protection for the at least one bypass route candidate; and selecting the bypass route from among the at least one bypass route candidate based on the length and the priority.

5. The method according to claim 4, wherein determining the priority comprises:

acquiring at least one of population distribution information collected via a portable device of a driver or a fixed device on the HEV, geographic feature information, or information about the exhaust gas restricted area set in the navigation system; and determining the priority using the acquired information.

6. The method according to claim 1, wherein the exhaust gas restricted area comprises an area in which a reduction in discharge of the exhaust gas is recommended or compelled.

7. A non-transitory computer-readable recording medium having a program recorded thereon, the program to direct a processor to perform acts of:

receiving, through a global positioning system (GPS) receiver of a hybrid electric vehicle (HEV), a current location information of the HEV, and transferring the received current location information to a navigation system;

determining whether an exhaust gas restricted area is present on a driving route of the HEV based on the received current location information, destination information and GPS information of the HEV;

a first determination of determining whether it is possible for the HEV to travel through the entire exhaust gas restricted area under a first-mode of driving in which only an electric motor of the HEV drives the HEV while the HEV is traveling on the driving route through the exhaust gas restricted area;

calculating a charging route where charging of a battery of the HEV is performed in a second-mode of driving in which an engine of the HEV drives the HEV when it is not possible for the HEV to travel through the entire exhaust gas restricted area under the first-mode of driving;

a second determination of determining whether it is possible for the HEV to travel through the entire exhaust gas restricted area under the first-mode of driving while the HEV travels on the calculated charging route;

controlling the HEV to travel on the calculated charging route in the second-mode of driving, and switching to the first-mode of driving when the HEV enters the exhaust gas restricted area;

performing the first-mode of driving from a time of entering the exhaust gas restricted area until a time of exiting the exhaust gas restricted area after traveling the calculated charging route when the driving through the entire exhaust gas restricted area under the first-mode of driving is possible; and calculating a bypass route based on determination that traveling the entire exhaust gas restricted area under the first-mode of driving is not possible even after traveling the charging route, wherein at least one of the first determination or the second determination comprises:

calculating a first energy required for the first-mode of driving to travel through the entire exhaust gas restricted area; and comparing the calculated first energy with a second energy corresponding to a currently available state-of-charge (SoC) of a battery of the HEV, and wherein calculating the charging route comprises:

determining at least one charging route candidate between the received current location and a beginning point of the exhaust gas restricted area on the driving route of the HEV;

calculating a third energy corresponding to an expected charging amount of the battery for the at least one charging route candidate; and selecting the charging route from among the at least one charging route candidate based on the first energy, the second energy, the third energy, and optimal-efficiency power of a powertrain of the HEV.

8. A hybrid electric vehicle (HEV) comprising:

a global positioning system (GPS) receiver configured to receive a current location information of the HEV, and transfer the received current location information to a navigation system;

a first controller configured to determine whether an exhaust gas restricted area is present on a driving route of the HEV based on the received current location information, destination information and GPS information of the HEV; and a second controller configured to:

make a first determination of whether it is possible for the HEV to travel through the entire exhaust gas restricted area under a first-mode of driving in which only an electric motor of the HEV drives the HEV when the exhaust gas restricted area is present on the driving route, calculate a charging route where charging of a battery of the HEV is performed in a second-mode of driving in which an engine of the HEV drives the HEV when the HEV is not possible to travel through the entire exhaust gas restricted area under the first-mode of driving,
make a second determination of whether it is possible for the HEV to travel through the entire exhaust gas restricted area under the first-mode of driving while the HEV travels on the calculated charging route,
control the HEV to travel on the calculated charging route in the second-mode of driving, and switch to the first-mode of driving when the HEV enters the exhaust gas restricted area;
perform the first-mode of driving from a time of entering the exhaust gas restricted area until a time of exiting the exhaust gas restricted area after traveling the calculated charging route when the driving through the entire exhaust gas restricted area under the first-mode of driving is possible; and
calculate a bypass route based on a determination that traveling the entire exhaust gas restricted area under the first-mode of driving is not possible,
wherein the second controller is further configured to:
perform at least one of the first determination or the second determination by calculating a first energy required for the first-mode of driving to travel through the entire exhaust gas restricted area,
compare the calculated first energy with a second energy corresponding to a currently available state-of-charge (SoC) of a battery of the HEV,
determine at least one charging route candidate between the received current location and a beginning point of the exhaust gas restricted area on the driving route of the HEV,
calculate a third energy corresponding to an expected charging amount of the battery for the at least one charging route candidate, and
select the charging route from among the at least one charging route candidate based on the first energy, the second energy, the third energy, and optimal-efficiency power of a powertrain of the HEV.

9. The hybrid electric vehicle according to claim 8, wherein the second controller is configured to calculate the first energy based on an average driving load and an expected driving time of the exhaust gas restricted area.

10. The hybrid electric vehicle according to claim 8, wherein the currently available SoC of the battery is a value acquired by subtracting a preset maintenance SoC of the battery from a current SoC of the battery.

11. The hybrid electric vehicle according to claim 8, wherein the second controller is configured to control the first-mode of driving from a time of entering the exhaust gas restricted area until a time of exiting the exhaust gas restricted area after traveling the calculated charging route when the driving through the entire exhaust gas restricted area under the first-mode of driving is possible.

12. The hybrid electric vehicle according to claim 8, wherein the second controller is configured to:
determine at least one bypass route candidate between the received current location and the destination of the driving route to avoid the exhaust gas restricted area on the driving route,
determine a length and a priority based on an object of protection for the at least one bypass route candidate, and
select the bypass route from among the at least one bypass route candidate based on the length and the priority.

13. The hybrid electric vehicle according to claim 12, wherein the second controller is configured to:
acquire at least one of population distribution information collected via a pedestrian portable device or a fixed device on the HEV, geographic feature information, or information about the exhaust gas restricted area set in the navigation system, and
determine the priority using the acquired information.

14. The hybrid electric vehicle according to claim 8, wherein the exhaust gas restricted area comprises an area in which a reduction in discharge of the exhaust gas is recommended or compelled.

* * * * *